United States Patent
Holt et al.

(10) Patent No.: US 8,240,215 B2
(45) Date of Patent: Aug. 14, 2012

(54) NON-CONTACT PRESSURE SENSING USING LASER-INDUCED DIELECTRIC BREAKDOWN

(76) Inventors: Ray Glynn Holt, Natick, MA (US);
Todd William Murray, Golden, CO (US); Jonathan Robert Sukovich, Brighton, MA (US)

( * ) Notice: Subject to any disclaimer, the term of this patent is extended or adjusted under 35 U.S.C. 154(b) by 270 days.

(21) Appl. No.: 12/781,262

(22) Filed: May 17, 2010

(65) Prior Publication Data

US 2012/0166104 A1    Jun. 28, 2012

Related U.S. Application Data

(60) Provisional application No. 61/178,777, filed on May 15, 2009.

(51) Int. Cl.
*G01L 9/00*    (2006.01)
(52) U.S. Cl. ......................................................... 73/705
(58) Field of Classification Search ............. 73/700–756
See application file for complete search history.

(56) References Cited

U.S. PATENT DOCUMENTS

| 4,342,907 | A | * | 8/1982 | Macedo et al. | .......... 250/227.14 |
| 4,443,700 | A | * | 4/1984 | Macedo et al. | .......... 250/227.16 |
| 4,682,500 | A | * | 7/1987 | Uda | ............................... 73/705 |
| 2011/0190640 | A1 | * | 8/2011 | Bremer et al. | ................ 600/478 |

* cited by examiner

*Primary Examiner* — Andre Allen
(74) *Attorney, Agent, or Firm* — BainwoodHuang (57) ABSTRACT

A technique for measuring pressure of a material directs one or more laser beams at the material (e.g., a pressurized fluid) to create a distribution of electromagnetic field intensity which varies over an intensity range and induces dielectric breakdown in the material. An emission pattern of broadband light from the dielectric breakdown is detected, and a value of a characteristic of the emission pattern (e.g., location of a threshold intensity or of a peak intensity) is processed (e.g., by a computer or similar electronic processor) to generate a pressure measurement signal representing a pressure of the material. Processing typically employs a pre-established calibration function which associates a set of stored values of the characteristic with corresponding known pressures of the material, obtained for example by preceding similar measurements of the same material under conditions of known pressures.

20 Claims, 5 Drawing Sheets

NON-CONTACT PRESSURE SENSING USING LASER-INDUCED DIELECTRIC BREAKDOWN

GOVERNMENT RIGHTS

The invention was made with government support under Contract No. W9113M-07-C-0178 awarded by the US Army Space and Missile Defense Command. The government has certain rights in the invention.

BACKGROUND

The present invention is related to the field of pressure measurement.

In many processes in both the research laboratory and in industry it is desirable to have a measure of static and/or dynamic pressure. In many instances it is impossible to use contact transducers. In other instances it is desired to make the measurement in a short time. In other instances one cannot introduce a probe into the bulk of a material to make measurements.

It can be difficult to make measurements of acoustic pressure in the bulk of a material functioning as a resonator when the pressure amplitudes are very high (order of tens of MPa). Conventional hydrophones may be compromised in their measurement capacity. They also can contribute to undesirable cavitation in liquid media and can be damaged by such cavitation. Schlieren techniques can give qualitative information, but are very difficult to extract quantitative information from. Optical hydrophones are capable of such measurements, but they are notoriously difficult to work with and also prone to damage from cavitation, forcing a user to extract a probe fiber from an assembly to cleave a new tip.

In solids or liquids, stationary pressure distributions are common when vibratory excitation is applied. However, the distribution of such pressure is very difficult to measure without embedded sensors. Transient pressure distributions are equally difficult to measure.

SUMMARY

It would be desirable for many applications to employ a pressure sensor that is non-contact and capable of both high spatial resolution and high temporal resolution. An example application is measuring the field within a fluid-filled spherical resonator, for example a resonator being roughly 25 cm in diameter oscillating in a particular mode at 30 kHz. It may be desirable, for example, to determine the spatial field of the resonator to about 5 mm resolution with about 100 ns of temporal resolution (or better if more than ten harmonics are required).

Presently disclosed apparatus and methods addresses these needs by providing a spatially localized, non-contact measurement of pressure. The phenomenon of dielectric breakdown is employed as a measure of pressure. Specifically, the breakdown threshold electric field strength is a function of the pressure of a dielectric liquid, and thus a measurement of dielectric breakdown can provide an inferred measurement of pressure. By employing a pulsed, focused laser as the imposed electric field, a measurement of pressure can be made that is highly localized both in space (order of laser focal zone) and in time (order of the pulse width of the laser).

The dielectric strength of a transparent medium is a function of both the molecular properties of the medium as well as the pressure in the medium. It is a relatively weak function especially at low pressures. For example, there is almost negligible variation in dielectric strength for pressure changes on the order of an atmosphere or less. However, when the pressure of interest is of the order of tens or hundreds of atmospheres, then the dielectric strength can vary by enough to make a measurable difference.

When the local electric field exceeds the dielectric strength, an ionization event occurs, followed by a cascade of ionization events. This cascade is known as dielectric breakdown. The following are salient results of dielectric breakdown in a transparent medium:

1. Emission of broadband light, owing primarily to the accelerations of free electrons (although some radiative recombination contributions may also occur). The acceleration effect is known as Bremsstrahlung, or 'braking radiation', and can come from electron-electron, electron-neutral, and electron-ion interactions.
2. Cascade ionization leading to localized free electron regions (plasmas) which serve to strongly absorb and scatter the incident laser radiation.

Thus light emitted from dielectric breakdown, along with absorbed and scattered laser radiation from the breakdown region, can serve as a diagnostic for pressure via the pressure dependence of dielectric strength. In one particular embodiment, a pulsed laser is used as the source of an applied electric field which causes the breakdown. If the laser is highly focused, then measurements can be spatially localized or resolved in three dimensions, with resolution being limited primarily by the focusing optics. Measurements can also be resolved temporally, with resolution being limited primarily by pulse width (e.g., femtosecond resolution is generally possible with femtosecond pulse widths).

The sensing of the emitted light is facilitated by the nature of the breakdown ionization event. The light pulse will be variably long depending on several factors, but can range from femtoseconds to nanoseconds. The emitted light will be broadband, and thus can easily be distinguished from the narrowband laser light if necessary in any particular application.

Generally, the disclosed technique involves directing a set of one or more laser beams at a material (e.g., a pressurized fluid) to create a distribution of electromagnetic field intensity in the material, with the electromagnetic field intensity varying over a predetermined intensity range in which dielectric breakdown of the material is expected to be induced by the set of laser beams. If the pressure is known to be within a given range, the field intensity distribution is selected accordingly so that it includes field intensities that should cause the dielectric breakdown from which a more precise pressure measurement is obtained. An emission pattern of broadband light emitted by dielectric breakdown of the material is detected while the set of laser beams is directed at the material. The detection generates a detector output signal which represents a detected value of a characteristic of the emission pattern, and this detector output signal is processed (e.g., by a computer or similar electronic processor) to generate a pressure measurement signal representing a pressure of the material. This processing typically employs a pre-established calibration function which associates a set of stored values of the characteristic with corresponding known pressures of the material, obtained for example by preceding similar measurements of the same material under conditions of known pressures.

The set of laser beams may be generated sequentially over a period of time, or concurrently over a range of space within the material. The emission pattern and the characteristic of interest may similarly have either or both a temporal component and/or a spatial component. As described in more detail below, one approach employs the field intensity distribution to identify a threshold intensity at which there is transition from no or little dielectric breakdown to some/more dielectric breakdown, and the characteristic of interest is where/when this transition occurs in the emission pattern. In another type of approach, the characteristic of interest may the value of a peak light intensity within the emission pattern. Depending on the technique used, an imaging detector (such as a CCD for example) may be utilized, or a simpler non-imaging detector (e.g., photodiode or photomultiplier tube) may suffice.

In one embodiment using threshold detection, a relatively low intensity focused pulsed laser beam is directed into the bulk of a transparent material. An optical detector (avalanche photodiode, photomultiplier tube, etc.) of sufficient temporal resolution and sensitivity is placed so that it can detect light emitted at the laser's focal point. The basic operation is to direct a laser beam into the material and sense the presence or absence of light emission at the focal point. This is repeated at different laser beam intensities to identify a threshold intensity just sufficient to induce dielectric breakdown as indicated by detectable light emission. A calibration process is typically performed in which this process is performed at different known pressures to create a calibration curve for the threshold intensity as a function of pressure. During subsequent measurements at unknown pressures, the laser intensity is varied through a range where there is a transition from no breakdown to detectable breakdown, and the calibration curve is used to translate the value of the laser intensity at the transition point to a corresponding pressure of the medium. Multiple measurements may be taken to obtain an average and thereby reduce noise. By varying the position of the focal point of the laser, spatial distributions of pressure can be measured. Also, by varying the time of arrival of the laser pulse with respect to some fixed phase of a time-varying (acoustic or hydrodynamic) pressure source, the temporal behavior of a periodic or repetitive pressure field can be measured.

In another embodiment, a focused pulsed laser beam is directed into the bulk of a transparent medium, and an imaging detector (charge-coupled device (CCD) or similar optically sensitive array) of sufficient temporal resolution and sensitivity is placed so that it images the path of the beam through the material. The effect of the beam focusing is to create breakdown along the beam path in a region about the focal point. Both the length of the region and the peak intensity of light emission in the region are functions of the pressure in the transparent medium. Measurements can be repeated to create calibration curve(s) for either or both the breakdown length and light intensity as function(s) of pressure. Thereafter, measurements of unknown pressures can employ a laser beam power expected to create a pattern of breakdown about the focal point, and the calibration curve(s) is/are used to translate the value(s) of the length and/or peak light intensity to a corresponding pressure of the medium. Again, multiple measurements may be taken to obtain an average and thereby reduce noise.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
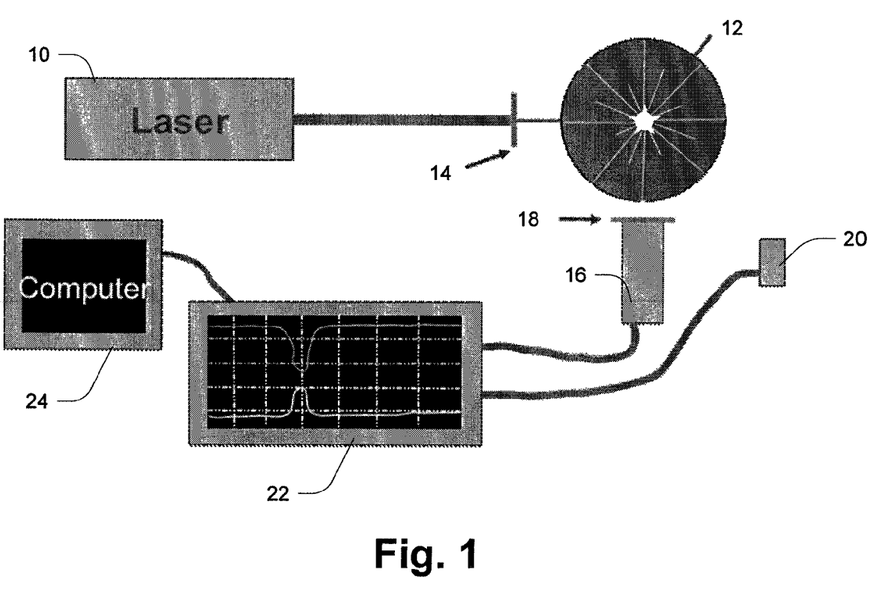
FIG. 1 is a block diagram of a pressure measurement system.

FIG. 1 shows a system which may be used to perform pressure measurements according to the first technique described above, i.e., threshold detection. A laser beam from a pulsed laser 10 is incident on a vessel 12 containing a material (e.g. a fluid) whose pressure is to be measured. Focusing optics 14 focus the laser beam at a position (e.g., center) of the vessel 12. A photomultiplier tube (PMT) 16 is located orthogonal to the laser beam axis, with a detection window pointed towards the center of the vessel 12. A band reject filter 18 may be placed in front of the PMT 16 to block scattered laser light and allow preferential detection of broadband light emitted by dielectric breakdown of the material in the vessel 12 during operation. A second photodetector (PD) 20 may be placed nearby to detect scattered laser light, generating a corresponding electrical signal which may be used as a timing signal. The vessel 12 may be entirely transparent, or it may have transparent sections via which light can enter and exit (e.g., for the laser beam and broadband light to the PMT 16. In one embodiment, the laser 10 is a Nd:YAg laser generating light at a wavelength of 512 nm, and the filter 18 if present is configured to reject light of this wavelength. As shown, the system may also include an oscilloscope 22 or similar instrument receiving detector output signals from the PMT 16 and PD 20, along with a computer 24 coupled to the oscilloscope 22 for controlling operation as well as performing any of a variety of back-end processing tasks, as described in more detail below.

The system of FIG. 1 may operate as generally described above. Pulses of light from the laser 10 are directed into the material within the vessel 12 via the focusing optics 14, and the PMT 16 is triggered to operate to sense the presence or absence of light emission at the focal point of the laser light. This operation is repeated at different laser beam intensities. The computer 24 electronically processes the signals from the PMT 16 along with information about the pattern of beam intensities to identify a threshold intensity which is just sufficient to induce dielectric breakdown as indicated by detectable light emission. In an embodiment such as that of FIG. 1 using only a single laser beam, the repetition is achieved by multiple firings from the laser 10 over time, with suitable adjustment of the intensity of the laser beam for each firing. Such an intensity adjustment can be achieved by using separate optics (not shown in FIG. 1) as generally known in the art. Once the threshold intensity is identified, a calibration function can be used to convert the threshold intensity into a corresponding pressure measurement signal (e.g., pressure data value or an analog pressure signal) within the computer 24) which may be used for any of a variety of purposes generally known in the art.

It will be appreciated that if measurements are to be made non-destructively, then it may be desirable for the material within the vessel 12 to have a "self-healing" characteristic to limit or even reverse the induced dielectric breakdown. Generally, most solids do not have such a characteristic—dielectric breakdown is in most cases irreversible. Liquids and other fluids typically inherently have such a characteristic—many ionized particles tend to re-form into atoms/molecules of the original material after the laser excitation is removed. One particular example of a suitable material is water, which is commonly employed in a variety of pressurized applications.

As described above, a calibration process is typically performed prior to taking any measurements of unknown pressures. During calibration, the above process of repeated detections at different intensities is repeated for each of a set of known pressures to create a calibration curve for the threshold intensity as a function of pressure. During subsequent measurements at unknown pressures, the beam intensity is varied through a range such that there is a transition from no breakdown to a detectable breakdown, with the intensity at the transition point being a "breakdown threshold intensity". The calibration curve is used to translate the breakdown threshold intensity to a corresponding pressure. As previously noted, the threshold intensity of breakdown is one characteristic of a pattern of emitted light that may be related to pressure by a calibration function. The calibration function is generally a set of relationships between stored values of the characteristic of interest (e.g., threshold breakdown intensity) and corresponding known pressures. The calibration function can be used by comparing a measured value of the characteristic of interest (e.g., a measured threshold breakdown intensity as just described) with the stored values to identify the most closely matching stored value, and then taking the corresponding known pressure as the measured pressure.

As indicated above, multiple measurements may be taken to obtain an average and thereby reduce noise. If desired, the position of the focal point of the laser may be varied to measure a spatial distributions of pressure. This can be useful to measure acoustic pressure fields such as standing waves within the vessel 12. Also, by varying the time of arrival of the laser pulse with respect to some fixed phase of a time-varying (acoustic or hydrodynamic) pressure source, the temporal behavior of a periodic or repetitive pressure field can be measured.

Figure 2:
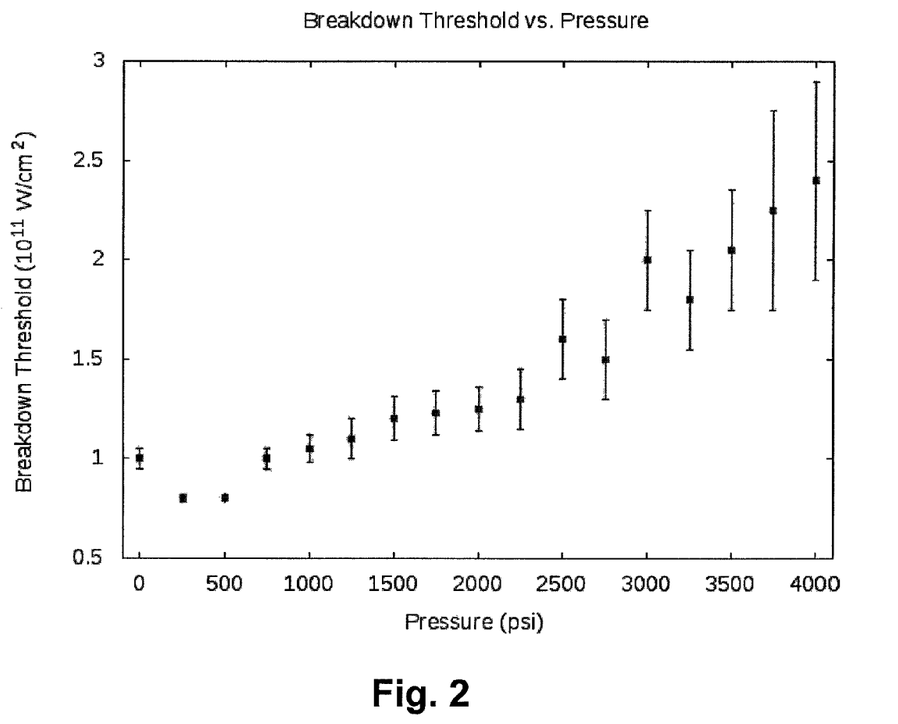
FIG. 2 is a plot of breakdown threshold versus pressure.

FIG. 2 provides an illustration of an example relationship between breakdown threshold and pressure. In this example, breakdown thresholds are over a range from 0.5 to $3 \times 10^{11}$ W/cm$^2$, while the pressures are over a range of 0 to 4000 PSI. In FIG. 2 the data is presented in the form of error bars and corresponding mid-points. The plot illustrates a general rise in breakdown threshold with rising pressure. This plot shows that measurements are subject to considerable variance which could impose undue limits on measurement resolution. This limitation can be reduced by performing multiple measurements and applying statistical techniques to generate output values with a desired degree of confidence. That is, statistical processing can be performed to generate a derived pressure measurement value having a much higher statistical confidence than the confidence of any individual measurement.

It is noted here that when multiple measurements are taken over a period of time, it may be necessary to provide adequate temporal spacing to permit the material to self-heal to a sufficient degree. In particular, this technique can induce localized cavitation which would interfere with measurements if present, and thus it may be necessary to wait sufficiently long between repetitions to permit any such cavitation to subside.

Figure 3:
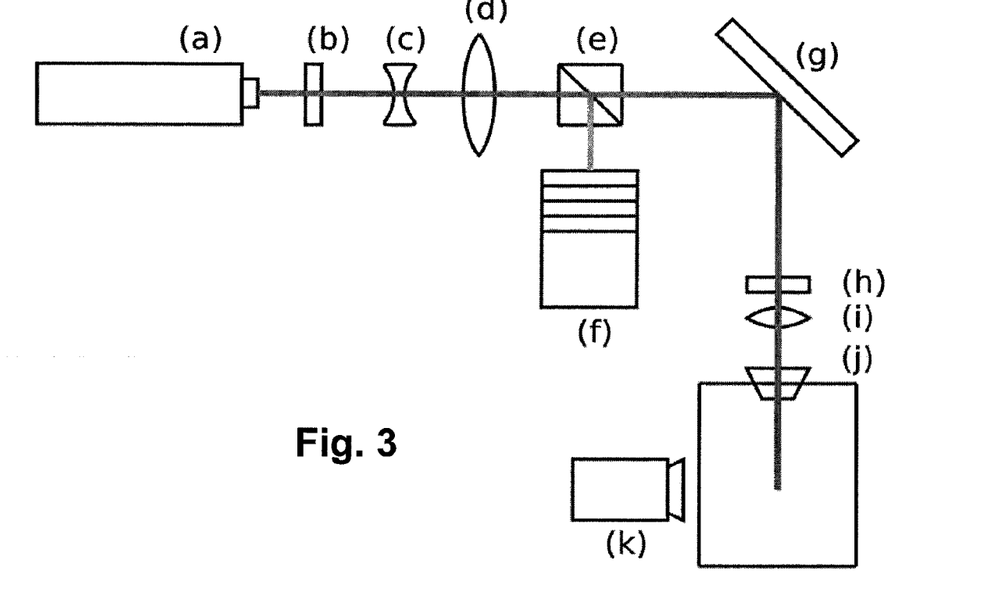
FIG. 3 is a block diagram of a pressure measurement system.

FIG. 3 illustrates a system that may be particularly suitable for the second detection technique described above, i.e., the imaging of light emission from breakdown. In this system, light from a frequency-doubled Nd:YAg laser (a) is passed through a 5×5 phase grating (f) to produce 25 individual beams which are then focused into the center of the pressure vessel (j). A digital CCD camera (k) is used to collect an image of the breakdown event. Although not shown in FIG. 3, image data output from the camera (k) is provided to a computer or similar device for processing.

Figure 4:
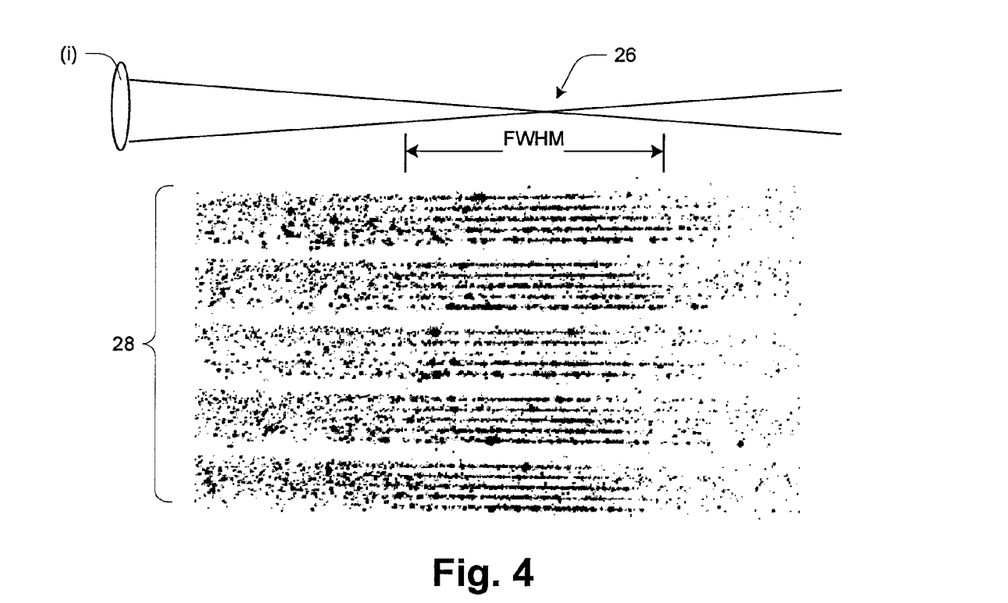
FIG. 4 is an image depicting patterns of emitted light when a number of concurrently generated laser beams are used.

FIG. 4 illustrates a pattern of broadband light created within the vessel (j) due to breakdown induced by the incident laser beams. At the top of FIG. 4 there is a schematic depiction of an individual beam from the focusing optics (d) through and beyond a focal point 26. The remaining part of FIG. 4 depicts an image (with tones inverted) of lines 28 of emitted light along paths of the 25 laser beams directed into the vessel 12. Because of the focusing of each beam, its areal power density or intensity varies along its path, gradually rising to a maximum at the focal point 26 and then gradually diminishing beyond it. A region of "full width half maximum" or FWHM beam intensity is shown. The spatially varying intensity of each beam causes a corresponding varying intensity of emitted light along the path of each beam. This pattern of emitted light is captured by the camera (k) (FIG. 3) and then processed to obtain pressure information. As in the previous example, it will normally be necessary to utilize a calibration procedure which precedes measurement of unknown pressures, and then during the measurement of unknown pressures the images obtained by the camera (k) are used in conjunction with a calibration curve or function to obtain corresponding pressure values.

One of the values of using multiple beams is the ability to obtain multiple measurements at one time, which is desirable because of the need for statistical processing to obtain pressure values having sufficient confidence. Thus in the above example, the light intensity values of the different beams at a given horizontal position can be treated as a set of measurements which can be statistically processed (e.g., summed or averaged). It is assumed that the pressure is sufficiently uniform throughout the material. Also, the process may be performed multiple times to obtain more measurements.

Figure 5:
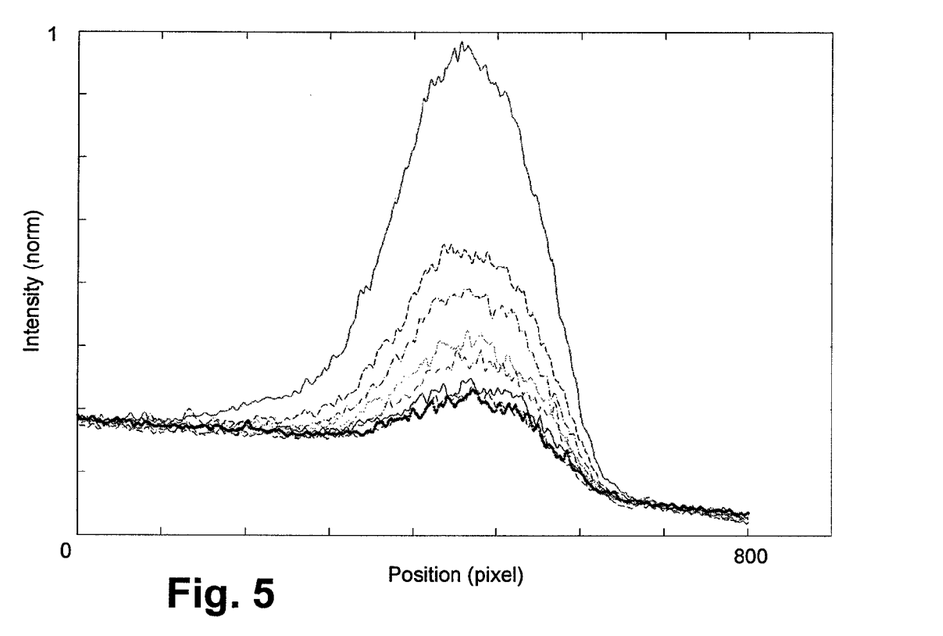
FIG. 5 is a plot of normalized peak emitted light intensity as a function of position along a beam path.
Figure 6:
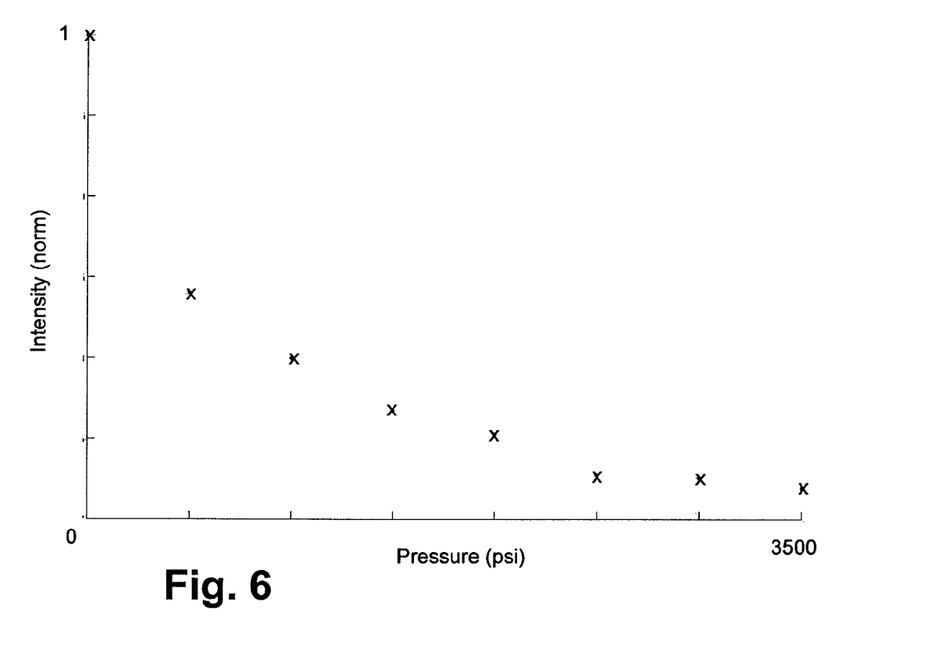
FIG. 6 is a plot of normalized emitted light intensity as a function of pressure.

FIG. 5 provides an example of summed intensity (over the 25 beams) as a function of axial or horizontal position (in the direction of the beams, from pixel 0 to pixel 800) for eight different static pressures ranging from 0 to 3500 PSI in 500 PSI increments, with the uppermost curve corresponding to 0 PSI. The linear intensity distribution is generally hill-shaped (or hump-shaped). This figure demonstrates a dependence between pressure and both a width measure of the distribution (e.g., FWHM path length) as well as the peak intensity along the path. FIG. 6 provides a more explicit illustration of the dependence of normalized peak light intensity (statistical mean) on pressure. A plot of the FWHM path length versus pressure shows a similar dependence.

Figure 7:
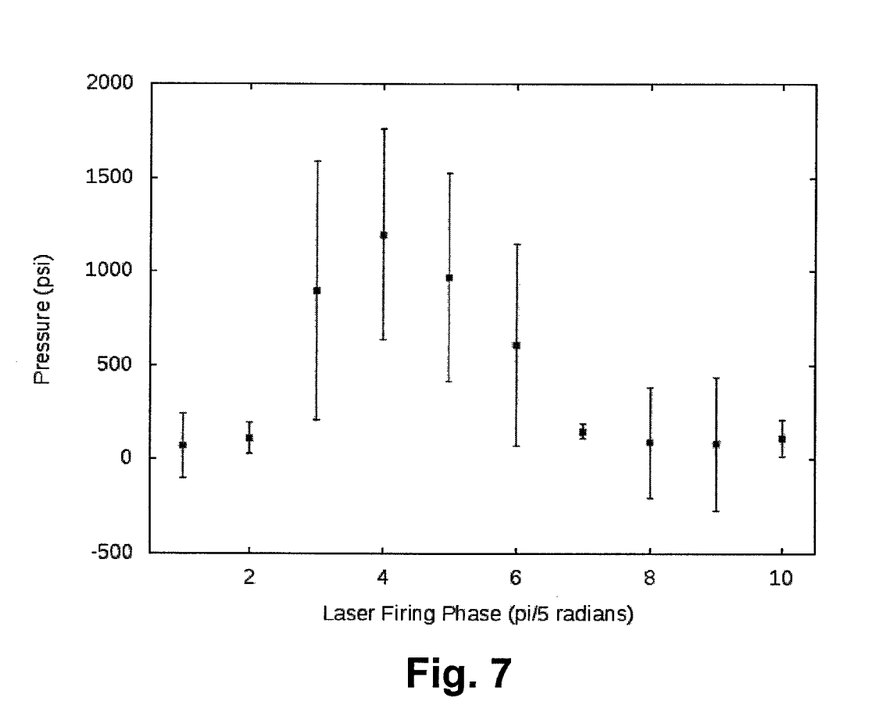
FIG. 7 is a plot of pressure as a function of laser firing phase.

FIG. 7 illustrates results using temporal (phase-delayed) varying of laser pulsing in the presence of a standing acoustic wave within the vessel 12. The measurements are taken at a fixed location at different phase values, shown as increments of it/5 radians (with respect to the period of the standing wave).

The technique described herein may have several advantages, including its ability to make measurements in a non-contact and relatively remote manner, and a capability of very high pressure measurements with a wide dynamic range. This is in contrast to standard pressure probes that must be in contact with (or even immersed in) the host medium to work. Temporal resolution can be extremely high, limited by the pulse length of the laser and thus yielding potential resolutions in the tens of femtoseconds. The spatial resolution is similarly good, limited by the radial beam waist dimension, which can be as small as 10 microns with a suitable optical setup.

While various embodiments of the invention have been particularly shown and described, it will be understood by those skilled in the art that various changes in form and details may be made therein without departing from the spirit and scope of the invention as defined by the appended claims.

For example, one variant is to employ wavelength selectivity to detect the threshold, for example by tuning a monochromator to some wavelength far removed from the laser wavelength. Then, detection is achieved when the broadband breakdown light yields energy in the selected band. Further, anything that varies the breakdown strength can be secondarily inferred. If the breakdown strength of the pure substance as a function of pressure is known, then the addition of ions in solution, or dissolved gas concentrations etc. will change both the threshold and the path length of breakdown events in proportion to the concentration of the ionic or dissolved species.

In another variation, a "cross-correlation" technique may be used in which the detector 20 or (k) is placed along the axis of the laser beam(s). Using this approach, it can be possible to subtract out the effect of laser light that reaches the detector, by performing a correlation between the detected light and the light pulse incident on the vessel 12.

Applications for the disclosed technique include remote, non-contact pressure sensors for transparent solids and transparent liquids. For quasi-static pressure measurements, flowing liquids in pipes can be investigated and a pressure profile measured across any cross-section. For acoustic measurements, any solid or liquid that possesses a standing or traveling acoustic wave of sufficient amplitude can be interrogated with this technique. Specific applications may include sonochemistry and various ultrasound-based systems including imaging and medical treatment.

What is claimed is:

1. A method of measuring pressure of a material, comprising:
    directing a set of one or more laser beams at the material to create a distribution of electromagnetic field intensity therein, the electromagnetic field intensity varying over a predetermined intensity range in which dielectric breakdown of the material is expected to be induced by the set of laser beams;
    detecting an emission pattern of broadband light emitted by dielectric breakdown of the material as the set of laser beams is directed at the material; and
    electronically processing a detector output signal representing a detected value of a characteristic of the emission pattern to generate a pressure measurement signal representing a pressure of the material according to a pre-established calibration function which associates a set of stored values of the characteristic with corresponding known pressures of the material.

2. A method according to claim 1, wherein:
    the electromagnetic field intensity distribution is a spatial intensity distribution and the emission pattern is a detected spatial emission pattern in a region of the material, the detected spatial emission pattern having a spatial characteristic having a detected spatial value;
    the stored values include a set of stored spatial values of the spatial characteristic; and
    the electronic processing generates the pressure measurement signal by (a) comparing the detected spatial value to the set of stored spatial values, and (b) selecting the known pressure whose corresponding stored spatial value most closely matches the detected spatial value.

3. A method according to claim 2, wherein:
    the spatial intensity distribution is a linear spatial intensity distribution created along a path of one of the laser beams by focusing the one laser beam to a focal point;
    the detected spatial emission pattern is a linear emission pattern along the path of the one laser beam and the detected spatial value is a value of the spatial characteristic of the linear emission pattern; and
    the set of stored spatial values are a set of stored values of the spatial characteristic of respective linear emission patterns occurring at the known pressures.

4. A method according to claim 3, wherein the spatial characteristic of the linear emission pattern is an intensity value of a peak emission intensity within the linear emission pattern.

5. A method according to claim 3, wherein the spatial characteristic of the linear emission pattern is a width of a hill-shaped spatial intensity distribution within the linear emission pattern.

6. A method according to claim 2, wherein:
    the spatial intensity distribution is created by multiple spaced-apart ones of the set of laser beams having a corresponding set of different intensity values;
    the detected spatial emission pattern is a emission pattern across spaced-apart ones of the laser beams, the emission pattern exhibiting a transition from non-emission to emission, and the detected spatial value is a value of a spatial location of the transition; and
    the set of stored spatial values are a set of stored values of locations of spatial transitions corresponding to the known pressures.

7. A method according to claim 1, wherein:
    the set of laser beams are a temporal series of laser beams each focused at the same location in the material, the temporal series of laser beams having a corresponding set of distinct intensity values, and the emission pattern is a temporal emission pattern exhibiting a transition from non-emission to emission at a temporal location in the series of laser beams identified by a detected location value;
    the stored values include a set of stored location values of temporal locations of transitions corresponding to the known pressures; and
    the electronic processing generates the pressure measurement signal by (a) comparing the detected location value to the set of stored location values, and (b) selecting the known pressure whose corresponding stored location value most closely matches the detected location value.

8. A method according to claim 1, wherein the directing, detecting and electronically processing are performed multiple times for a corresponding plurality of sets of laser beams to generate a corresponding plurality of measured pressure measurement signals exhibiting statistical variance, and further comprising performing statistical processing of the plurality of measured pressure measurement signals to obtain a derived pressure measurement signal having substantially higher confidence than a confidence of any individual one of the measured pressure measurement signals.

9. A method according to claim 8, wherein each set of laser beams has exactly one laser beam, and the plurality of sets of laser beams is a superset in which the sets of laser beams are concurrently generated and spatially separated.

10. A method according to claim 8, wherein each set of laser beams has one or more concurrently generated spatially separated laser beams, and the plurality of sets of laser beams is a superset in which the sets of laser beams are sequentially generated and temporally separated.

11. A system for measuring pressure of a material, comprising:
a laser subsystem operative to direct a set of one or more laser beams at the material to create a distribution of electromagnetic field intensity therein, the electromagnetic field intensity varying over a predetermined intensity range in which dielectric breakdown of the material is expected to be induced by the set of laser beams;
a detector operative to detect an emission pattern of broadband light emitted by dielectric breakdown of the material as the set of laser beams is directed at the material; and
an electronic processor operative to electronically process a detector output signal representing a detected value of a characteristic of the emission pattern to generate a pressure measurement signal representing a pressure of the material according to a pre-established calibration function which associates a set of stored values of the characteristic with corresponding known pressures of the material.

12. A system according to claim 11, wherein:
the electromagnetic field intensity distribution is a spatial intensity distribution and the emission pattern is a detected spatial emission pattern in a region of the material, the detected spatial emission pattern having a spatial characteristic having a detected spatial value;
the stored values include a set of stored spatial values of the spatial characteristic; and
the electronic processor is operative to generate the pressure measurement signal by (a) comparing the detected spatial value to the set of stored spatial values, and (b) selecting the known pressure whose corresponding stored spatial value most closely matches the detected spatial value.

13. A system according to claim 12, wherein:
the spatial intensity distribution is a linear spatial intensity distribution created along a path of one of the laser beams by focusing the one laser beam to a focal point;
the detected spatial emission pattern is a linear emission pattern along the path of the one laser beam and the detected spatial value is a value of the spatial characteristic of the linear emission pattern; and
the set of stored spatial values are a set of stored values of the spatial characteristic of respective linear emission patterns occurring at the known pressures.

14. A system according to claim 13, wherein the spatial characteristic of the linear emission pattern is an intensity value of a peak emission within the linear emission pattern.

15. A system according to claim 13, wherein the spatial characteristic of the linear emission pattern is a width of a hill-shaped spatial intensity distribution within the linear emission pattern.

16. A system according to claim 12, wherein:
the laser subsystem includes a beam splitter and intensity adjustment optics operative to create the spatial intensity distribution by concurrently creating multiple spaced-apart ones of the set of laser beams having a corresponding set of different intensity values;
the detected spatial emission pattern is a spatial emission pattern across the spaced-apart ones of the set of laser beams, the spatial emission pattern exhibiting a transition from non-emission to emission, and the detected spatial value is a value of a spatial location of the transition; and
the set of stored spatial values are a set of stored values of spatial locations of transitions, the set of spatial values corresponding to the known pressures.

17. A system according to claim 11, wherein:
the laser subsystem includes pulse control circuitry and focusing optics operative to create the set of laser beams as a temporal series of laser beams each focused at the same location in the material, the temporal series of laser beams having a corresponding set of distinct intensity values, and the emission pattern is a temporal emission pattern exhibiting a transition from non-emission to emission at a temporal location in the series of laser beams identified by a detected location value;
the stored values include a set of stored location values of temporal locations of transitions corresponding to the known pressures; and
the electronic processor generates the pressure measurement signal by (a) comparing the detected location value to the set of stored location values, and (b) selecting the known pressure whose corresponding stored location value most closely matches the detected location value.

18. A system according to claim 11, wherein the laser subsystem, detector and electronic processor are operative to repeat the directing, detecting and processing multiple times for a corresponding plurality of sets of laser beams to generate a corresponding plurality of measured pressure measurement signals exhibiting statistical variance, and wherein the electronic processor is further operative to perform statistical processing of the plurality of measured pressure measurement signals to obtain a derived pressure measurement signal having substantially higher confidence than a confidence of any individual one of the measured pressure measurement signals.

19. A system according to claim 18, wherein each set of laser beams has exactly one laser beam and the plurality of sets of laser beams is a superset in which sets of laser beams are concurrently generated and spatially separated.

20. A system according to claim 18, wherein each set of laser beams has one or more concurrently generated spatially separated laser beams, and the plurality of sets of laser beams is a superset in which the sets of laser beams are sequentially generated and temporally separated.

* * * * *